May 19, 1942.  F. J. DALEY  2,283,491
BORING APPARATUS
Filed Dec. 20, 1939  2 Sheets-Sheet 1
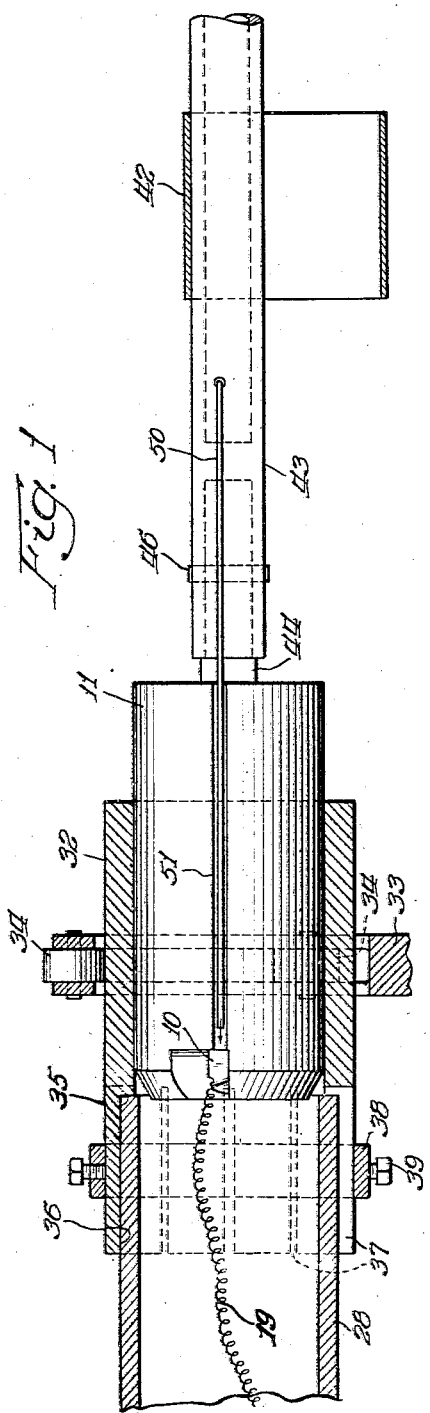
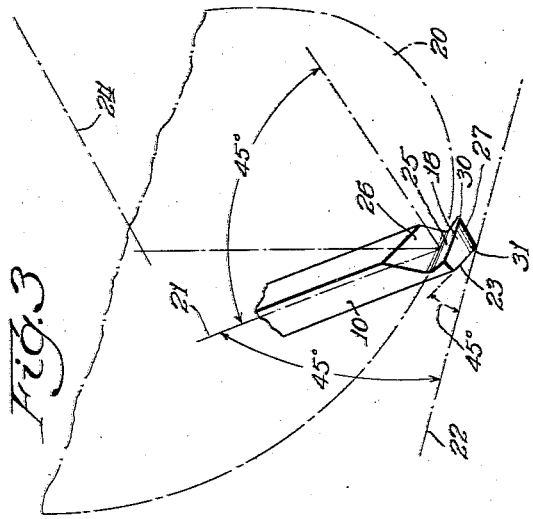
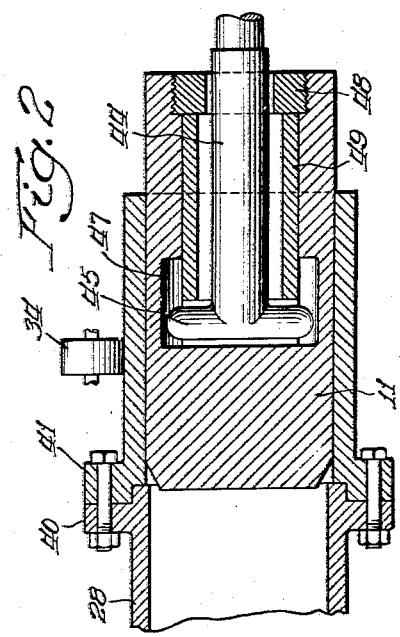
Inventor:
Frank J. Daley
By: Roland C. Rehm
Atty.

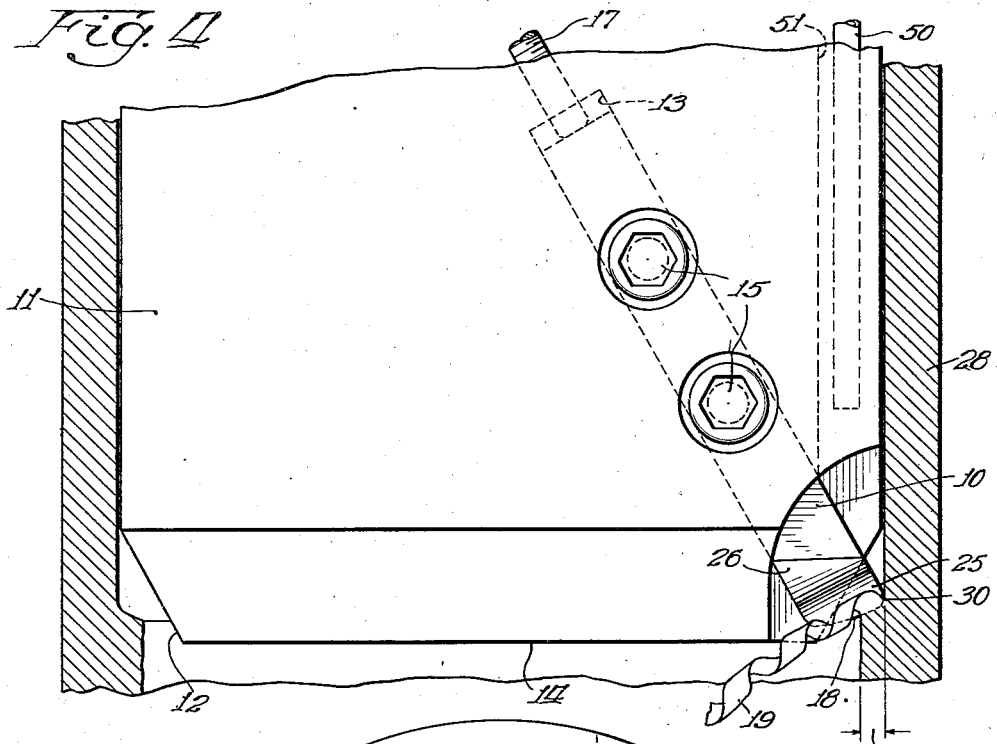
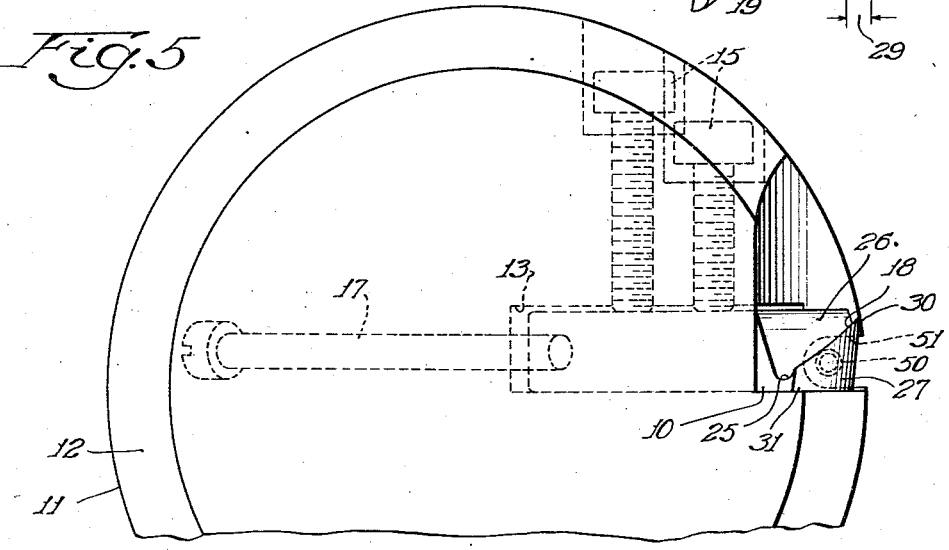

Patented May 19, 1942

2,283,491

UNITED STATES PATENT OFFICE 2,283,491

BORING APPARATUS

Frank J. Daley, Chicago, Ill., assignor to Hannifin Manufacturing Company, Chicago, Ill., a corporation of Illinois Application December 20, 1939, Serial No. 310,111

9 Claims. (Cl. 77—55)

This invention relates to boring of cylinders and the like and, among other objects, aims to improve the accuracy of boring cylinders.

The nature of the invention may be readily understood by reference to one illustrative apparatus shown in the accompanying drawings.

In said drawings:

Fig. 1 is a longitudinal view partly in section of the boring tool in its relation to the cylinder to be bored and to the pilot or starting cylinder;

Fig. 2 is a similar view showing the boring head in section and a different form of pilot cylinder;

Fig. 3 is a perspective view of the cutting tool in relation to a grinding wheel for grinding the tool;

Fig. 4 is a plan view, partly in section and on an enlarged scale, of the leading portion of the boring head and the cutting tool; and Fig. 5 is an end view of the boring head and cutting tool.

Despite their obvious advantages, the use of hydraulic and air operating cylinders for various apparatus has been minimized because of high cost or the difficulty of providing a true and uniform bore. Irregularities in the bore cause leakage past the piston, and in long cylinders also interfere with smooth operation.

Finishing cylinders, and particularly long cylinders, to a true and uniform bore has heretofore been an expensive and time consuming operation. Boring usually produces a tapered bore because of deflection of the tool, and grinding and honing are slow and expensive methods of removing metal. Because of inaccuracies and particularly lack of uniformity in wall thickness, it has generally been the practice to use cast iron cylinders with thick walls.

The present method of machining the cylinder bore not only produces cylinders having a true and uniform bore at a much lower cost than heretofore but makes it possible to form cylinders with relatively thin walls from various types of standard steel pipe.

By use of the illustrative method and apparatus, it is possible to bore a cylinder with a single pass of the boring tool to within a few thousandths of an inch, i. e. from .005 to .010, of finished size, and the bore will within these small tolerances be uniform and without taper regardless of the length of the cylinder. According to the illustrative method, the metal is removed (in a single cut) by a shearing action in a thin shaving of uniform thickness but varying in width in accordance with variations in the amount of metal to be removed. The cutting tool is constructed and arranged so that the portion of its cutting edge which makes the finishing cut has a uniform loading and does not encounter scale or surface hard spots. This portion of the cutting edge is, therefore, protected from substantial wear and does not alter during the boring operation sufficiently to produce any appreciable variation in diameter of the bore from one end of the cylinder to the other.

The illustrative cutting tool 10 is carried in a head 11 whose diameter is only sufficiently less than that of the finished bore to permit the head to travel through the bore without substantial binding. In the present instance, for a ten inch bore the head may advantageously be from .003 to .006 of an inch less than the diameter of the bore. The front or leading end of the head is tapered as at 12 to provide sufficient space for the cutting tool while supporting it as closely as practicable to its cutting edge. As here shown, the head is provided with a recess 13, rectangular in section in this case, for seating the tool. For most efficient action, i. e., long life of cutting edge and low power consumption, it is advantageous to arrange the tool at an angle from 30° to 45° to the face 14 of the head or at an angle from 60° to 45° to the axis of the head. The cutting tool is clamped in place by clamp screws 15 whose heads lie in recesses in the head 11. A backing screw 17 threaded into the head facilitates fine adjustment of the cutting tool.

The illustrative cutting tool is formed so that its cutting edge 18 (Figs. 3, 4 and 5) is given a reverse rake to cause the shaving or chips 19 to leave the cutter in what is normally a reverse direction, that is, in the direction of relative travel of the boring tool. In Fig. 1 the tool is about to engage but has not yet engaged the metal; nevertheless, to avoid repetition in illustration, a continuous shaving 19 is shown extending down the bore in the direction of tool travel. It will be understood that the shaving is not formed until after the tool shall have started cutting. Fig. 3 illustrates one convenient method of properly forming the cutting tool. As there shown, the tool stock (which, in this instance, is a bar of high grade cutting steel ⅝" square in section) is mounted with reference to a grinding wheel 20 about ten inches in diameter with its axis 21 at an angle of about 45° to the plane 22 tangential to the cylindrical face of the cutting wheel at the grinding point. The stock is also axially twisted so that one of its lower faces 23 also is at an angle of about 45° to the aforesaid tangential plane. This produces a downwardly inclined cutting face which gives the tool its reverse rake. The axis 21 of the stock also lies in a plane perpendicular to the aforesaid tangential plane and extending at an angle of about 30° to 45° from a similar plane through the axis 24 of the grinding wheel, depending upon the particular angle at which the cutting tool is mounted in the head 11. The aforesaid angles are given by way of illustration; it is not essential that these precise angles be employed. With the cutting stock thus mounted, the grinding wheel forms a downwardly inclined, slightly concave face 25 (conforming with the cylindrical contour of the face of the grinding wheel) and a face 26 (ground by the flat side of the grinding wheel) substantially at a right angle to the face 25. The face 26 insures the curling of the shaving into a relatively small helix; this face, of course, progressively increases in depth as the tool is re-ground from time to time to sharpen it. Fig. 3 illustrates the condition of the tool after repeated sharpening. The nose 27 of the tool is preferably rounded on a 10 inch or 12 inch radius so as to make the cutting edge 18 slightly curved. This curvature advantageously makes the shaving 19 slightly concave in section so as to give the chip when curled substantial stiffness despite the thinness of the cut (about .005" in this instance), thereby insuring its travel down the bore of the cylinder 28 and its automatic discharge therefrom (see Fig. 1). This substantially eliminates the tendency of the shaving to accumulate inside the bore of the cylinder.

Broken shavings may be flushed out of the cylinder in advance of the boring head by the cutting fluid, as presently described. With a sharp tool there is little tendency for the shaving to break.

In Fig. 4 the cutting head and its tool are shown making a cut through the cylinder 28. Only a single cut is made in boring the cylinder. The depth 29 of the metal removed may vary considerably from ⅟₁₆" or less to ½"; but this variation manifests itself only in variation in the width of the shaving (see Fig. 4) and not in its thickness. Its thickness remains absolutely uniform depending upon the rate of feed of the tool which, in the present case, is such as to make a cut of about .005" in thickness. By inclining the surface of the cut relative to the axis of the bore (so that the cut surface is generally conical), it is possible to widen the shaving and reduce its thickness without reducing the rate at which metal is removed. This distributes the load over a greater portion of the cutting edge and correspondingly reduces the rate of wear. A wider shaving also reduces the chance of breaking the continuity of the shaving. Despite the thinness of the shaving, the boring process is nevertheless relatively rapid since cutting speeds often reach 200 feet per minute. The portion 30 of the cutting edge which finishes the bore always carries a uniform load. It is never overloaded and never encounters the hard scale and hard spots which occur on the inner face of the cylinder. This gives the tool a very substantial life and makes it possible to machine a cylinder, regardless of its length, to a uniform bore despite the wear which may occur on those portions of the cutting edge 18 which encounter the hard spots and scale.

The lower portion 31 of the nose of the tool is, of course, ground away sufficiently to provide adequate clearance between it and the face of the cylinder. The clearance requirements for smaller diameter cylinders are, of course, greater than for the larger diameter cylinders since the curvature of the smaller cylinders is greater.

In Fig. 1 is illustrated a preferred method of boring a cylinder. To align the boring head 11 with the axis of the cylinder, a pilot cylinder 32 is first attached to one end of the cylinder 28. Where, as in the present instance, relative rotation between the cylinder and the boring tool is effected by rotating the cylinder, the latter is mounted for rotation at its opposite end and centered so that the axis of the exterior surface of the cylinder coincides with the axis of rotation. The pilot cylinder is also mounted for rotation in a conventional steady rest 33 having a plurality of rollers 34 for supporting and centering the cylinder. The steady rest is, of course, adjusted so that the axis of the surface of the pilot cylinder coincides with the axis of rotation. Preferably the end 35 of the cylinder is turned square so as to facilitate axial alignment of the pilot cylinder with the cylinder 28. The pilot cylinder may be attached to the cylinder in various ways. For mounting on a plain cylinder, the pilot is provided with a socket 36 whose walls are preferably split at 37 in one or more places to permit the pilot cylinder to be clamped tightly on the cylinder 28. The clamping means here shown is in the form of a clamping ring 38 having tightening screws 39. For a cylinder having head flanges 40, the pilot cylinder is advantageously formed with flanges 41 for attachment to the cylinder flanges (see Fig. 2).

To set the boring tool 10 in proper position, a setting ring or cylinder 42 is advantageously employed. Such a ring may be made from a short section of pipe finished to the diameter of the cylinder to be bored. Before introducing the boring head 11 into the pilot cylinder, the setting ring is slipped over the end of the head 11 and the boring tool 10 adjusted until it barely contacts with the setting cylinder. Proper adjustment is made evident by rotating the setting ring by hand around the head and adjusting the boring tool until it slightly scratches the surface of the setting cylinder. The latter is then withdrawn and can be used over and over to make a given adjustment of the boring tool.

As here shown the boring tool is controlled by an elongated bar 43 in the form of a hollow shaft which, in this instance, advances the boring tool through the cylinder and at the same time holds it against rotation with the cylinder. Preferably the bar 43 has a floating connection with the boring head. One such connection is illustrated in Fig. 2 wherein a connecting bar 44 having a T-shaped extremity 45 is carried in the end of the bar 43 and connected thereby by pin 46. The T-shaped extremity 45 loosely fits in recesses 47 in the head by means of which force is transmitted from the head to the bar. A nut 48 and sleeve 49 serve to hold the bar 44 against detachment from the head while at the same time allowing sufficient lost motion to prevent binding.

Cutting and lubricating fluid is advantageously introduced into the cylinder through a small supply tube 50 which lies in a recess 51 in the head 11 and discharges adjacent the cutting tool 10. The tube 50 is not anchored tightly in the head 11 and permits slight movement thereof relative to the bar 43. The fluid discharged therefrom also serves to flush out broken cuttings.

Obviously the invention is not limited to the details of the illustrative method and apparatus since these may be variously modified. Moreover, it is not indispensable that all features of the invention be used conjointly since various features may be used to advantage in different combinations and sub-combinations.

Having described my invention, I claim:

1. Boring apparatus for boring cylinders and the like comprising in combination a pilot head having an exterior bearing surface of substantially the diameter of the bore to be machined in the cylinder, a boring tool, said head having a recess for seating said boring tool and provided with means for clamping the tool in adjusted position in said head, said recess and clamping means being arranged to hold the tool at an acute angle to the axis of the bore with a substantially short portion of the tool projecting from the head, said tool having a cutting edge projecting laterally from the leading end of said head in position to make an endwise cut from the thickness of metal to be removed, said cutting edge being inclined with a reverse rake to cause the cuttings to leave the tool in advance of said head and means for relatively rotating and advancing the cylinder and said head.

2. Boring apparatus for boring cylinders and the like comprising in combination a pilot head having a boring tool projecting from the forward end of said head and supported thereby, said pilot head being cylindrical and being supported in the machined portion of the bore behind said tool, means for relatively advancing said pilot head and cylinder and for relatively rotating the same, said tool being arranged to take a generally endwise cut from the thickness of metal to be removed and having a cutting edge slightly curved to give the shaving a transverse curvature to stiffen it, said cutting edge and the surface of the tool behind the cutting edge being inclined downwardly in the direction of advance of the tool to give the tool a reverse rake so as to discharge the shaving in the direction of advance of the tool.

3. Boring apparatus for boring cylinders and the like comprising in combination a pilot head having a cylindrical bearing surface of substantially the diameter of the bore to be machined in the cylinder, said head having a longitudinally adjustable boring tool projecting therefrom forwardly of said cylindrical bearing surface, said tool having a cutting edge arranged to cut on a line converging forwardly toward the axis of the head to form a shaving wider than the radial thickness of the metal to be removed, said cutting edge having a reverse rake to direct the shaving coming from the cutting edge toward the unbored end of the cylinder in advance of said pilot head.

4. Boring apparatus for boring cylinders and the like comprising in combination a pilot head having a cylindrical bearing surface of substantially the diameter of the bore to be machined in the cylinder, said head having a longitudinally adjustable boring tool whose cutting edge substantially entirely projects therefrom forwardly of said cylindrical bearing surface, said cutting edge being arranged at an acuate angle to the axis of the bore to form a shaving wider than the radial thickness of the metal to be removed and being inclined relative to the cut to be taken from the metal so as to form the shaving into a helix which leaves the tool in the direction of tool travel.

5. Boring apparatus for boring cylinders and the like comprising in combination a pilot head having a cylindrical bearing surface of substantially the diameter of the bore to be machined in the cylinder, said head having a longitudinally adjustable boring tool whose cutting edge projects therefrom forwardly of said cylindrical bearing surface but not radially substantially beyond said cylindrical surface, said cutting edge being inclined with a reverse rake so as to direct the shaving as it leaves the tool toward the unmachined portion of the bore.

6. The method of machining cylinder bores which comprises supporting a boring tool on a pilot head whose diameter is substantially the final diameter of the bore to be machined, rigidly connecting to the end of the cylinder to be entered by the boring tool a pilot cylinder whose internal diameter is that of the bore to be machined and axially aligning the pilot cylinder with the cylinder to be bored, initially aligning the pilot head with the axis of the cylinder to be bored by advancing the pilot head cylinder through the pilot, and rotating the cylinder relative to the pilot head while supporting the pilot head in the machine bore in axial alignment with the cylinder.

7. The method of boring cylinders and the like which comprises removing the metal from the interior of the cylinder with a shearing cut at an acute angle to the radial thickness of the metal to be removed so that the width of the shaving will be substantially greater than the radial thickness of the metal removed and the metal as it is cut will be curled into a helical shaving and directed down the unmachined portion of the bore, relatively rotating and advancing the cylinder and tool used to make the cut, progressively supporting the tool on the bored surface of the cylinder closely adjacent the cut so as to maintain a constant relation between the cutting edge and the axis of the bored cylinder.

8. In apparatus for boring cylinders and the like, the combination comprising a pilot cylinder whose bore is that of the bore to be machined in the cylinder, means for rigidly attaching the pilot cylinder to the cylinder to be bored with the bore of said pilot cylinder in axial alignment with the bore to be formed in said cylinder so as to be rotatable with the cylinder to be bored and provide a support therefor, said pilot cylinder having an exterior bearing surface coaxial with its internal bore, and bearing means engaging said exterior bearing surface for supporting said cylinder for rotation during the boring operation coaxially with the bore of said pilot cylinder.

9. The method of boring cylinders and the like which comprises supporting a boring tool on a pilot head of subtsantially the external diameter of the final machined bore, adjusting said tool and arranging substantially the entire cutting edge thereof at an acute angle to the axis of the bore so that the face of the cut will be inclined at an acute angle to the axis of the bore, and advancing the tool relatively to the cylinder at a uniform rate to produce a shaving of uniform thickness, the width of which shaving will be dependent on the radial width of the metal to be removed and the thickness of which will depend on the rate at which the pilot head is fed, feeding the pilot head through the cylinder, and simultaneously centering the pilot head by supporting it in accurate axial alignment with the finished bore of the cylinder behind the tool.

FRANK J. DALEY.

CERTIFICATE OF CORRECTION.

Patent No. 2,283,491. May 19, 1942.

FRANK J. DALEY.

It is hereby certified that error appears in the printed specification of the above numbered patent requiring correction as follows: Page 3, first column, line 66, claim 4, for "acuate" read --acuce--; and second column, lines 21 and 22, claim 6, for "head cylinder through the pilot" read --head through the pilot cylinder--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.